Aug. 18, 1970     S. GOLDSCHMIED     3,524,247
SOLDERING METHOD
Original Filed Nov. 7, 1966
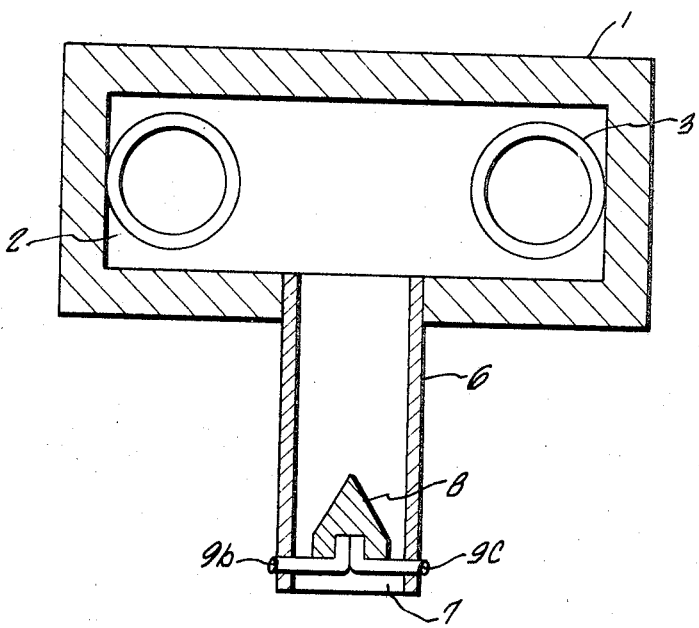
FIG.1
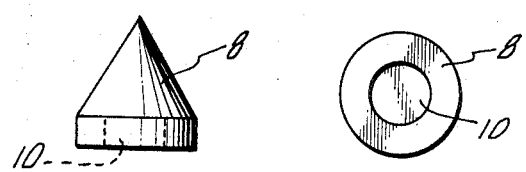
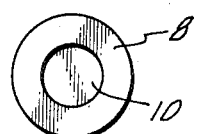
FIG 3A     FIG 3B
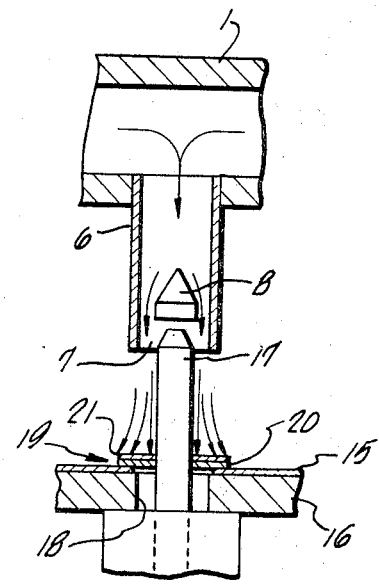
FIG.4
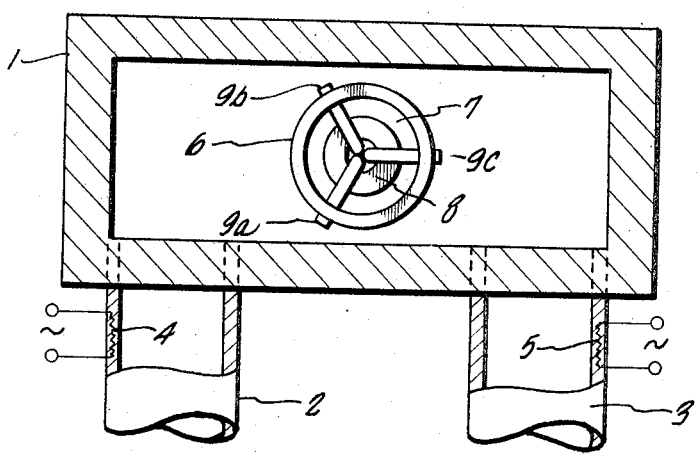
FIG.2
INVENTOR.
SANDOR GOLDSCHMIED
BY
Christie, Parker & Hale
ATTORNEYS.

United States Patent Office 3,524,247
Patented Aug. 18, 1970

3,524,247
SOLDERING METHOD
Sandor Goldschmied, Anaheim, Calif., assignor to Burroughs Corporation, Detroit, Mich., a corporation of Michigan
Continuation of application Ser. No. 592,485, Nov. 7, 1966. This application Feb. 11, 1969, Ser. No. 800,824
Int. Cl. B23k 31/02, 35/24
U.S. Cl. 29—498
10 Claims

ABSTRACT OF THE DISCLOSURE

A soldering method is disclosed that employs a slug to divert fluid passing through a nozzle arrangement into an annular stream. The slug, which presents a conical surface to the fluid impinging upon it, is set back slightly from the mouth of the nozzle. As a result, the stream of fluid ejected from the nozzle is controlled to flow directly onto an annular area to be heated. The nozzle is particularly useful in indirect soldering to heat the annular area between a connector pin and the edge of a hole through which the pin protudes.

---

This is a continuation of a copending application Ser. No. 592,485, filed Nov. 7, 1966, and now abandoned.

This invention relates to soldering techniques and, more particularly, to a method especially suited for indirect heating in certain soldering situations.

The heat needed to form solder joints is usually provided either directly, by placing a soldering iron in contact with the area to be heated, or indirectly, by exposing the area to be heated to a stream of hot gas, infrared rays, or ultrasonic energy. Indirect heating techniques lend themeslves well to use in automated, production-line soldering operations and to situations in which the area to be heated is inaccessible to a soldering iron.

In the electrical and electronic industries, the situation sometimes arises in which a solder joint must be established between a conductive plate and a connector pin protruding through a hole in the plate. Since the development of printed circuit boards and microminiature circuitry, the need for better techniques to form solder joints in this situation has become particularly apparent. A copending application of mine entitled, "Formation of Solder Joints Across Gaps," Ser. No. 589,334, filed on Oct. 25, 1966, and assigned to the same assignee as the present invention discloses a method for applying the solder so as to form a good solder joint across the gap between the pin and the plate. Since the area to be heated, i.e., the area between the plate and the pin, is annular, it is difficult to heat by direct means.

Indirect heating by hot gas that emanates from a nozzle with a circular mouth located above the pin provides uniform heat to the annular area, but is not very satisfactory for other reasons. In particular, the connector pin, which is located near the mouth of the nozzle and directly in the line of the stream of hot gas emanating from the nozzle, acts as a heat sink that diverts the heat away from the desired area. The hot gas emanating from the nozzle must, therefore, be at a temperature substantially higher than the soldering temperature because of the distance and the inefficient heat transfer from the nozzle to the area to be heated. Further, the pin conducts heat to the insulative connector body with negligible temperature drop. As a result, the connector body becomes heated almost to the temperature of the hot gas at the mouth of the nozzle. Such high temperatures adversely affect the insulative materials commonly used for connector bodies.

The invention contemplates the use of a hot gas nozzle provided with a slug to divert the hot gas emanating from the mouth of the nozzle into an annular stream that flows around the pin to the area to be heated.

Specifically, the surface of the slug heading into the stream of gas is tapered to present a small resistance to flow. The slug is set back from the mouth of the nozzle by an amount that depends upon the extent of the area to be heated and the diameter of the connector pin. The interior of the nozzle has a cylindrical surface from the slug to the mouth of the nozzle. The setback of the slug is sufficient to confine the stream of hot gas to the area to be heated without permitting it to flow against the connector pin. Consequently, the flow of gas is laminar and an efficient transfer of heat from the mouth of the nozzle to the area to be heated takes place without heating the connector pin appreciably. In addition to obviating damage to the insulative connector body, the efficiency of the heat transfer enables use of a lower temperature for the hot gas emanating from the nozzle.

These and other features of the invention are considered further in the following detailed description taken in conjunction with the drawings, in which:

FIG. 1 is a side elevational view in cross section of a nozzle arrangement that can be used in the practice of the invention;

FIG. 2 is a bottom view of the nozzle arrangement of FIG. 1;

FIGS. 3A and 3B are side elevation and bottom views, repectively, of the slug shown in FIGS. 1 and 2; and FIG. 4 is a schematic diagram of the nozzle arrangement of FIG. 1 used in accordance with the soldering method of the invention.

Reference is now made to FIGS. 1 and 2 for a description of the construction of a nozzle arrangement used in the practice of the invention. Gas is fed into a rectangular manifold 1 through intake tubes 2 and 3. Heater elements 4 and 5, which are connected to a source of electrical energy, are embedded in the walls of tubes 2 and 3, respectively. As a result, the air entering manifold 1 is heated to the desired temperature. Use of a plurality of intake tubes facilitates the heating operation. A nozzle 6, which has a cylindrical interior surface, connects with manifold 1 and extends in a direction perpendicular to tubes 2 and 3. Nozzle 6 has a mouth 7 from which the hot gas emanates. A slug 8 is centered in nozzle 6 near mouth 7. L-shaped brackets 9a, 9b, and 9c suppor slug 8. At one end, brackets 9a, 9b, and 9c fit tightly into holes in the side walls of nozzle 6. At the other end, brackets 9a, 9b, and 9c fit tightly into a recess in slug 8, labeled 10 in FIGS. 3A and 3B. The surface of slug 8 that faces manifold 1 has a cone-shaped surface so as to minimize resistance presented by slug 8 to the flow of hat gas.

In FIG. 4 the nozzle arrangement is illustrated diagrammatically in a setting in which it may be utilized to particular advantage. A conductive plate 15 is mounted on an insulative circuit board 16. A connector pin 17 passes through on opening 18 in board 16 and plate 15, and extends to mouth 7. Pin 17 is axially aligned with and preferably smaller in diameter than slug 8. A solder preform 19 has a hole in it through which pin 17 fits. Preform 19 fills the gap between plate 15 and pin 17. Most advantageously, preform 19 would be one of the structures disclosed in my above-mentioned copending application. In such case, preform 19 could, for example, comprise a layer of copper 20 and a layer of solder 21 physically held together.

The arrows in FIG. 4 represent the path of hot gas flowing from the nozzle arrangement to preform 19. Hot gas from intake tubes 2 and 3 combines in manifold 1 and leaves manifold 1 through nozzle 6. As the hot gas approaches the apex of the conical surface of slug 8, it is diverted outwardly toward the periphery and emanates from mouth 7 in an annular stream. The end of slug 8 is set back from the plane of mouth 7. If the amount of setback is too small, the stream of gas tends to diverge too much and therefore extends beyond the area to be heated. An inefficient transfer of heat results. If the amount of setback is too great, the stream of gas tends to flow against the surface of pin 17, thereby creating some turbulence in the stream and heating pin 17. Accordingly, the amount of setback of slug 8 is experimentally determined so that the stream of gas is confined to the area to be heated without flowing against pin 17. Since pin 17 is axially aligned with slug 8, it is also axially aligned with the annular stream of gas emanating from mouth 7. Tolerances in the position of pin 7 must be taken into account in this determination. In this way, the most efficient transfer of heat from nozzle 6 to preform 19 is attained. Typical dimensions for a nozzle arrangement are: slug diameter—65 mils; inside nozzle diameter—118 mils; and slug setback—15 mils.

I claim:

1. A method for soldering a connector pin to a plate that bounds the pin comprising the steps of:
   placing solder in the area between the plate and the pin;
   generating a stream of hot fluid with cross-sectional shape substantially coinciding with that of the solder;
   and directing the stream to impinge upon and melt the solder without the stream substantially impinging upon the pin, thereby preventing the pin from overheating.

2. The method of claim 1, in which the stream of hot fluid is annularly shaped and directed so it is in axial alignment with the pin.

3. The method of claim 1, in which the stream of fluid is collimated so it is directed onto the solder without extending substantially beyond the area occupied by the solder.

4. The method of claim 1, in which the solder is supported by a layer of metal having a higher melting point than the solder.

5. A method for soldering a connector pin to a metallic plate surrounding the pin comprising the steps of:
   placing the solder in the area between the plate and the pin;
   placing over the pin the mouth of a nozzle having an outward flow diverting slug; and
   directing hot fluid through the nozzle to form an annular stream at the mouth of the nozzle which flows onto the solder to melt it.

6. The method of claim 5, in which the nozzle is placed over the pin such that the annular stream of fluid at the mouth of the nozzle is axially aligned with the pin.

7. The method of claim 5, in which the solder is physically held to a layer of metal having a higher melting point than the solder, the solder being exposed to the stream of hot fluid.

8. The method of claim 5, in which the slug is positioned in the nozzle so as to produce a collimated annular stream of hot fluid at the mouth of the nozzle.

9. The method of claim 6, in which the solder is physically held to a layer of metal having a higher melting point that the solder, the solder being exposed to the stream of hot fluid.

10. The method of claim 9, in which the slug is positioned in the nozzle so as to produce a collimated annular stream of hot fluid at the mouth of the nozzle.

References Cited

UNITED STATES PATENTS

| 11,876 | 10/1854 | Stevenson | 228—57 |
| 3,006,069 | 10/1961 | Rhoads et al. | 29—498 X |
| 3,089,449 | 5/1963 | Gutbier | 29—34 |
| 3,136,032 | 6/1964 | Berndsen | 29—498 X |

FOREIGN PATENTS

| 438,626 | 11/1935 | Great Britain. |

JOHN F. CAMPBELL, Primary Examiner

V. A. DI PALMA, Assistant Examiner

UNITED STATES PATENT OFFICE

CERTIFICATE OF CORRECTION

Patent No. 3,524,247     Dated August 18, 1970

Inventor(s) Sandor Goldschmied

It is certified that error appears in the above-identified patent and that said Letters Patent are hereby corrected as shown below:

Column 2, line 2, --collimated-- should be inserted after "annular"; ; line 23, "elevational" should be --elevation--.

Column 3, line 3, --collimated-- should be inserted after "annular"; between "stream" and the period should be inserted --, as depicted by the arrows in FIG. 4--.

Column 4, line 22, "that" should be --than--.

SIGNED AND SEALED
JAN 12 1971

(SEAL)
Attest:

Edward M. Fletcher, Jr.
Attesting Officer

WILLIAM E. SCHUYLER, JR.
Commissioner of Patents